United States Patent [19]
Haghiri et al.

[11] Patent Number: 5,200,821
[45] Date of Patent: Apr. 6, 1993

[54] ARRANGEMENT FOR PROCESSING SIGNALS BEFORE AND AFTER TRANSMISSION AND/OR STORAGE WITH FLOW RATE REDUCTION, AND SIGNAL TRANSMISSION AND/OR STORAGE SYSTEMS INCLUDING SUCH ARRANGEMENTS

[75] Inventors: Mohammad R. Haghiri, Sceaux; Pascal Denoyelle, Creteil; Thierry Fautier, Paris, all of France

[73] Assignee: U.S. Philips Corporation, New York, N.Y.

[21] Appl. No.: 613,830
[22] PCT Filed: Jun. 19, 1990
[86] PCT No.: PCT/NL90/00085
§ 371 Date: Feb. 8, 1990
§ 102(e) Date: Feb. 8, 1990
[87] PCT Pub. No.: WO90/16128
PCT Pub. Date: Dec. 27, 1990

[30] Foreign Application Priority Data
Jun. 20, 1989 [FR] France .................. 89 08186
Jun. 20, 1989 [FR] France .................. 89 08187

[51] Int. Cl.$^5$ .................. H04N 7/00; H04N 7/13
[52] U.S. Cl. .................. 358/133; 358/141; 358/138
[58] Field of Search .............. 358/133, 138, 136, 135, 358/140, 105, 141, 12; 364/725

[56] References Cited

U.S. PATENT DOCUMENTS

| | | | |
|---|---|---|---|
| 4,692,801 | 9/1987 | Ninomiya et al. | 358/133 |
| 4,862,264 | 8/1989 | Wells et al. | 358/138 |
| 4,873,573 | 10/1989 | Thomas et al. | 358/133 |
| 4,924,308 | 5/1990 | Feuchtwanger | 358/133 |
| 4,965,667 | 10/1990 | Trew et al. | 358/138 |
| 4,985,767 | 1/1991 | Haghiri et al. | 358/140 |
| 4,989,087 | 1/1991 | Pele et al. | 358/133 |
| 5,008,746 | 4/1991 | Bernard et al. | 358/133 |
| 5,027,206 | 6/1991 | Vroeswijk et al. | 358/133 |
| 5,031,039 | 7/1991 | Haghiri et al. | 358/138 |
| 5,036,392 | 7/1991 | Janssen | 358/138 |

FOREIGN PATENT DOCUMENTS

| | | |
|---|---|---|
| 146713 | 10/1984 | European Pat. Off. . |
| 175860 | 7/1985 | European Pat. Off. . |
| 252563 | 1/1988 | European Pat. Off. . |
| WO/8705770 | 9/1987 | United Kingdom . |

OTHER PUBLICATIONS

IEEE-Technology '88, Jan. pp. 56–58 Consumer Electronics.
Eureka 95-A World Standard? Electronics & Wireless World, Sep. 1988, pp. 845–850, Symposium Record Broadcast Sessions, Sat. Jun. 17.
Analyse de Structures de Sous-P. Bernard, M. Veillard, CCETT-Rennes-France.
Compact Disc Exploit Interactive Technologies CDV Gives Video Laser Disks a Boost New VCR and Camcorder Formats Produces Sharper Picture-High-Resolution Broadcast Pictures in the Offering-R. Jurgen IEEE Spectrum Jan. 1988, pp. 56–58.
HDMAC Coding for Compatible Broadcasting of HDTV Signals; Vreeswijk et al.

*Primary Examiner*—James J. Groody
*Assistant Examiner*—Michael H. Lee
*Attorney, Agent, or Firm*—Michael E. Marion

[57] ABSTRACT

In a signal transmission and/or storage system including a transmission stage and, after transmission and/or storage of the signals transmitted on a passband-limited information carrier which implies a processing operation for reducing the quantity of information components to be transmitted and/or stored, a receiving and/or read stage for the transmitted and/or stored signals, which arrangement for processing signals at the transmission end includes a temporal sub-sampling sub-assembly, a motion estimation sub-assembly, a recovery sub-assembly with motion compensation, a decision-taking sub-assembly, and a fall-back processing sub-assembly, with or without spatial sub-sampling. Respective signal processing arrangements provided at the receiving end correspond to these arrangements with or without the said spatial sub-sampling.

19 Claims, 4 Drawing Sheets

ARRANGEMENT FOR PROCESSING SIGNALS BEFORE AND AFTER TRANSMISSION AND/OR STORAGE WITH FLOW RATE REDUCTION, AND SIGNAL TRANSMISSION AND/OR STORAGE SYSTEMS INCLUDING SUCH ARRANGEMENTS

BACKGROUND OF THE INVENTION

The present invention relates to an arrangement for processing signals which are grouped in periodic clusters, such as images, and intended to be transmitted and/or stored block-wise over/on a passband-limited information carrier, which implies a reduction in the quantity of information components to be transmitted and/or stored.

The invention also relates to a signal transmission and/or storage system comprising a transmission stage and, after transmission and/or storage of the signals transmitted via a passband-limited information carrier which implies a reduction processing of the quantity of information components to be transmitted and/or stored, a receiving and/or read stage of the transmitted and/or stored signals, and in which the said transmission stage incorporates such a processing arrangement.

The invention also relates to a processing arrangement for signals which were previously transmitted and/or stored after reduction of the quantity of information components to be transmitted and/or stored, which is effected in accordance with a first mode of transmission and/or storage referred to as compensated mode using a temporal sub-sampling sub-assembly having a predetermined sub-sampling ratio and being provided to supply a first signal sequence, or in accordance with a second mode of transmission and/or storage referred to as fall-back mode using a fall-back processing sub-assembly provided to add to the said first sequence a second signal sequence, the choice of the said modes being effected with the aid of a decision-taking sub-assembly and on the basis of motion information components, which are also transmitted and/or stored, and an information component comparison associated with either one or the other mode, respectively.

The invention further relates to an arrangement for processing signals which were previously transmitted and/or stored after a reduction of the quantity of information components to be transmitted and/or stored, effected in accordance with a first mode of transmission and/or storage, referred to as compensated mode and in which mode with the aid of a temporal sub-sampling sub-assembly having a predetermined sub-sampling ratio and being intended to supply a first signal sequence, or in accordance with a second mode of transmission and/or referred to as storage fall-back mode and in which mode with the aid of a fall-back processing sub-assembly intended to add to the said first sequence a second sequence of signals, with a spatial sub-sampling of the said sequences, and for effecting the alternate selection of one or the other of the spatially sub-sampled sequences, the choice of the said mode being effected with the aid of a decision-taking sub-assembly and on the basis of motion information components which are also transmitted and/or stored, and a comparison of the information components which are associated with either one or the other mode, respectively, with a view to selecting either the output of the said motion compensation sub-assembly or the output of the said fall-back processing sub-assembly.

Finally, the invention also relates to a signal transmission and/or storage system comprising a transmission stage and after transmission and/or storage of the signals transmitted via a passband-limited information carrier which implies a reduction processing of the quantity of information components to be transmitted and/or to be stored, a receiving and/or read stage for the transmitted and/or stored signals.

This invention has a particularly interesting application in the case in which the signals to be processed include information components which represent animated images and in which a compact disc is used as the carrier of the transmitted and/or stored signals.

The transmission and/or storage of a very large quantity of information components, associated, for example, with images, generally implies a compression of the signals to be transmitted and/or to be stored, that is to say a reduction, in a predetermined ratio, of their number. The reduction ratio is inter alia determined by the fact that a sufficient quantity of signals must be preserved to avoid that the overall information they carry is not degraded too much, for example by the fact that one must preserve an acceptable picture quality within the scope of the cited Application.

The majority of the presently known signal coding methods to realize this flow rate reduction are based on orthogonal transforms of the discrete cosine transform type, which allow a flow-rate reduction in a ratio of the order of 10 to 1. For a significant number of applications and, for example when used in storing or processing images on compact disc, this ratio is not sufficient and a complementary reduction processing in a ratio of 2 to 1 was found to be indispensable.

SUMMARY OF THE INVENTION

It is therefore an object of the invention to provide a signal processing arrangement which obviates previously found insufficiencies as regards the flow-rate reduction.

To this end the invention relates to a signal processing arrangement of the type defined in the opening paragraph, which is characterized in that it comprises:

(a) a temporal sub-sampling sub-assembly in a predetermined ratio, provided to supply in a first transmission and/or storage mode, denoted compensated mode, a first sequence of signals to be transmitted and/or to be stored having a rate lower than that of the original signal clusters;

(b) a motion estimation sub-assembly for estimating motion between blocks which belong to consecutive periodical clusters, provided to supply block-wise a motion information to be transmitted or to be stored by replacing those blocks which are cancelled by said temporal sub-sampling;

(c) a signal block recovering sub-assembly with motion compensation, provided to supply on the one hand from those blocks which in the original signals provide the transmission and/or storage in accordance with the compensated mode and on the other hand from the motion information components associated with the said blocks by replacing the cancelled block, the signal blocks such as they are recovered at the receiving end by replacing the cancelled blocks and from the transmitted signal and motion information component sequences;

(d) a decision-taking sub-assembly, provided to supply block-wise, on the basis of a comparison involving the original signals and also the said signals recovered after motion compensation, an information about whether the said compensated mode is chosen or not chosen depending on the result of this comparison;

(e) a fall-back processing sub-assembly provided to add block-wise to the said first signal sequence, in accordance with a second fall-back transmission and/or storage mode, which, as a function of the result of the comparison serves as a substitute for the first compensated mode, at least a second signal sequence which is in synchronism with the first signal sequence.

In the structure thus proposed, the said predetermined ratio is preferably equal to ½. In that case and in accordance with an advantageous embodiment, the fall-back processing sub-assembly includes a delay circuit producing a delay equal to the period of the original signals, followed by a temporal sub-sampling circuit operating in the same ratio as the ratio of the temporal sub-sampling sub-assembly.

In a further, still more improved embodiment, the fall-back processing sub-assembly includes a spatial sub-sampling sub-assembly which comprises, arranged in parallel, a first and a second spatial sub-sampling path in the said predetermined ratio, the spatial sub-sampling frame being independent of the motion and being fixed but for the temporal resolution of the signals.

In this first structure, when the said predetermined ratio is equal to ½, the arrangement is preferably characterized in that:

(A) the spatial sub-sampling sub-assembly comprises, in each channel a spatial filtering circuit followed by a spatial sub-sampling circuit operating in a ratio ½, and, at the output of the two channels, a switching circuit provided to select alternately one or the other of the outputs of the spatial sub-sampling circuits, at a twice lower frequency than that of the original signals;

(B) the decision-taking sub-assembly includes a change-over switch controlled by a decision circuit to select, in the compensated mode, the output signals of the temporal sub-sampling sub-assembly or, in the fall-back mode, the output signals of the said switching circuit.

In a further embodiment of the fall-back processing sub-assembly, the arrangement is also characterized in that:

(A) the temporal sub-sampling ratio is equal to ½;

(B) the fall-back processing sub-assembly includes, arranged in parallel with the said temporal sub-sampling sub-assembly, a spatial sub-sampling sub-assembly which comprises two parallel-arranged channels the first of which comprises a first spatial sub-sampling circuit and the second comprises, arranged in series, a delay circuit producing a delay of one period of the original signals and a second spatial sub-sampling circuit, the spatial sub-sampling grid being independent of the motion and being fixed but for the temporal resolution of the signals, and the said two parallel channels being preceded, arranged in series, by a spatial filtering circuit and followed by a switching circuit provided to select alternately one or the other of the outputs of the spatial sub-sampling circuits, at a frequency which is twice lower than that of the original signals;

(C) the decision-taking sub-assembly comprises a change-over switch controlled by a decision circuit for selecting, in the compensated mode, the output signals of the temporal sub-sampling sub-assembly and, in the fall-back mode, the output signals of the said change-over switch.

In the specific application in which the signals to be transmitted and/or to be stored are representative of images, the signal processing arrangement is characterized in that the selection is effected for each block of the image and in that the decision circuit comprises a motion-compensated interpolation circuit, an interpolation error calculation circuit and an error fall-back calculation circuit.

When this application to image signals is used, the invention can be employed in a particularly advantageous manner when the carrier for the transmitted and/or stored signals is of the compact disc type.

A further object of the invention is to provide a processing arrangement for previously transmitted and/or stored signals, adapted, at the receiving side, to a signal recovery without loss of information components with respect to the motion contained in the original signals.

To that effect the invention relates, in a first embodiment, to an arrangement which is characterized in that it comprises:

(a) a motion-compensated sub-assembly provided to receive the transmitted and/or stored signals corresponding to the output signals of the said temporal sub-sampling sub-assembly;

(b) a change-over switch receiving at a first input the output of the motion-compensation sub-assembly and at a second input the transmitted and/or stored signals corresponding to the output signals of the said fall-back processing sub-assembly and supplying from its output, in accordance with the said mode information corresponding to the first or the second mode of operation either the signals present at the said first input or the signals present at the said second input, respectively;

(c) an alternating selection change-over switch for selecting at a frequency twice as high as that of the input signals, either the said output of this change-over switch or the input of the said motion-compensation sub-assembly but delayed by a half-period of the rate of the said input signals of the signal processing arrangement.

The invention also relates, in a variation constituting a second embodiment, to an arrangement which is characterized in that it comprise:

(a) a first sub-sampling and interpolation sub-assembly of the received signal corresponding to the previously transmitted and/or stored signals and constituting the input signals of the arrangement;

(b) a motion-compensation sub-assembly whose input is connected, in accordance with the said selection of the first or the second operating mode, respectively, either directly to the input of the said arrangement or to this same input but via the said first sub-sampling and interpolation sub-assembly;

(c) a second sub-sampling and interpolation sub-assembly whose input is connected, in accordance with the said selection of the first or the second mode of operation, respectively, either to the output of the said motion-compensation sub-assembly, or directly to the input of the said arrangement;

(d) a change-over switch which from its output or in accordance with the said mode information corresponding to the selection of the first or second mode of operation, respectively, supplies from its output either the output of the said motion-compensation sub-assembly or the output of the said second sub-sampling and interpolation sub-assembly;

(e) a change-over switch for alternately selecting at a frequency twice as high as the frequency of the input signals, either the said input of this change-over switch or the input of the said motion-compensation sub-assembly but delayed by a half-period of the rate of the said input signals of the arrangement.

In the case of this second embodiment, the arrangement is preferably characterized in that the first and second sub-sampling and interpolation sub-assemblies each comprise a spatial sub-sampling circuit and a spatial interpolation circuit, and in that the motion-compensation sub-assembly comprises image stores and an adder, with a view to a motion-compensated interpolation on the basis of the output image of the first of these memories of the input image of the second of these memories and of motion information between the said input and output images, the delay produced by each of these stores being equal to half the period of the input signals of the processing arrangement.

In one or the other of these structures, the arrangement is advantageously characterized, in that the selection at the input of the motion-compensation sub-assembly and the selection at the input of the second sub-sampling and interpolation sub-assembly are effected with the aid of a first and a second change-over switch, respectively, which are provided to switch in accordance with the said mode information.

BRIEF DESCRIPTION OF THE DRAWINGS

Particulars and advantages of the invention will now become more apparent in a more detailed manner from the following description which is given, by way of non-limitative example, with reference to the accompanying drawings, in which.

DETAILED DESCRIPTION OF THE PREFERRED EMBODIMENT OF THE INVENTION

In the application described here, the input signals have, for example, a repetition rate of 25 Hz and the processing arrangement for these signals must then supply signals at a rate of 12.5 Hz. This temporal sub-sampling by a factor of 2 is realized in the following manner, which is described in connection with mainly the FIGS. 1, 3 and 6.

Figure 1:
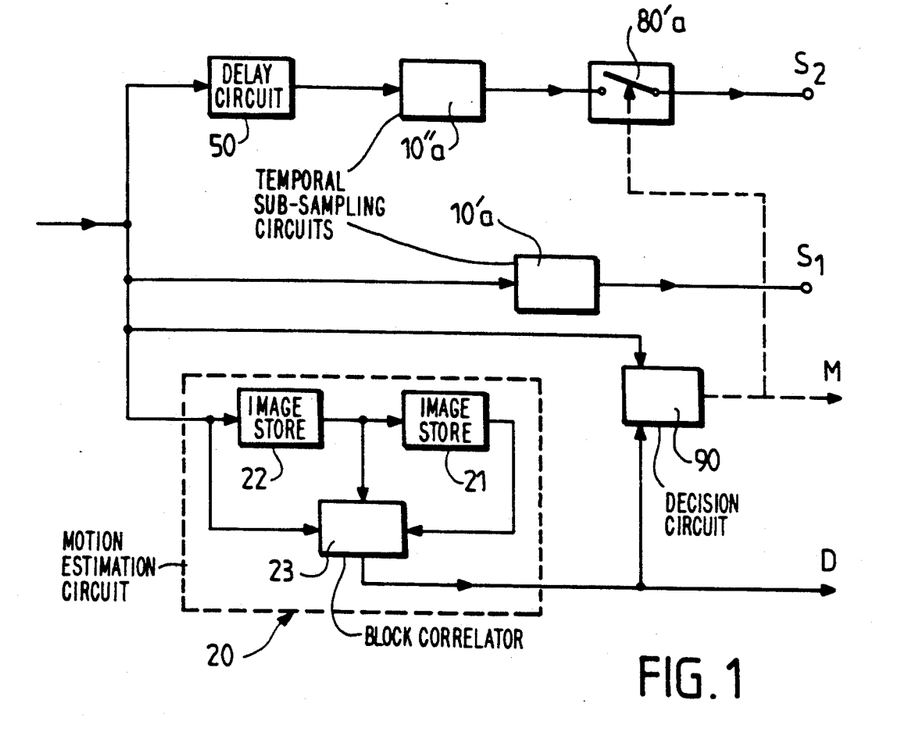
FIG. 1 shows a first example, in accordance with the invention, of an embodiment of the arrangement for processing signals intended to be transmitted and/or stored, after flow rate reduction.

The signal processing arrangement shown in FIG. 1, includes first of all a temporal sub-sampling sub-assembly provided for supplying, in accordance with a first (compensated) so-called transmission and/or storage mode, a first signal sequence (to be transmitted and/or stored) of a frequency lower than the frequency of the original signals in a predetermined ratio. Here this sub-assembly consists of a temporal sub-sampling circuit $10'a$ operating at half a ratio. On the other hand the arrangement includes a motion estimation sub-assembly here formed by a motion estimation circuit 20. The temporal sub-sampling circuit $10'a$ is, in the present case, a change-over switch which is controlled at half the original repetition rate, that is to say at 12.5 Hz here, and which consequently cancels one signal image out of every two signals in the sequence of image signals, for example the even images. The motion estimation circuit 20 acts on the non-cancelled images, in this case the odd images. In the example described, it is assumed that the image information components are processed in blocks of $16 \times 16$ image signals. For each of these blocks, the circuit 20 looks for the direction of the motion so as to ultimately deduce an approximation of this block on the basis of on the one hand the motion information thus obtained, denoted D, and on the other hand of the content of two images adjacent to the cancelled image. The motion-information components must also be transmitted and/or stored, by replacing those blocks which are cancelled by the temporal sub-sampling operation. FIG. 1 shows an example of the motion estimation circuit comprising two image stores 21 and 22 and a block correlator 23.

Correlators of this type are already known, for example from the article by J. R. Jain and A. K. Jain, "Displacement measurement and its application in inter-frame image coding", IEEE Transactions on Communications, vol. COM-29, no. 12, December 1981, pp. 1799 to 1808. The motion estimation by correlation thus proposed has for its effect to determine a displacement vector D for each block of the cancelled image, for example $I_2$, in a sequence of images $I_1$, $I_2$, $I_3$, etc. ...) in such a manner that it is possible to deduce from this knowledge of D an approximation $\hat{I}_2$ of the cancelled image from the half-sum of the non-cancelled images $I_1$ and $I_3$ surrounding it, in accordance with a relation of the type:

$$\hat{I}_2(X) = (\tfrac{1}{2})(I_1(X-D) + I_3(X+D))$$

wherein X is the spatial index of the current image element, $I_1$, $I_2$, $I_3$, the original images, D the shift (in image elements), and $\hat{I}_2$ the searched for approximation of the intensity of the element X of the current block of the cancelled image.

Expressed in other terms, this motion estimation is a search for each block, represented by a current element X, a vector D in such a manner that the expression:

$$\Sigma(DFD(X,D))^2$$

for the totality of blocks is minimal. In this expression, DFD, which is an abbreviation of the term "Display Frame Difference", is the approximation error linked with the current block and is equivalent, for this block, to the sum of the square of the approximation errors over all the image elements of the block. Consequently, this approximation error has for its expression:

$$\Sigma(I_2(X) - (\tfrac{1}{2})(I_3(X+D) + I_1(X-D))^2$$

(blocks)

and for this expression the minimal value is searched. The selected displacement vector is the vector which is associated with this minimal value, after an exhaustive test of all the possible displacement vectors in a search range limited by the horizontal and vertical values $D_x$ and $D_y$, respectively.

This signal processing arrangement also includes a fall-back processing sub-assembly which is intended to take over the operation in the compensated mode when the motion estimation sub-assembly is omitted in accordance with a predetermined criterion which will be described in greater detail hereinafter. In a general manner, the normal mode of operation is the motion estimation mode, which will allow an ultimate motion compensation and which consequently will be denoted the compensated mode, and this normal mode may in certain situations be replaced by a mode denoted the fall-back mode. This fall-back processing sub-assembly comprises a delay circuit 50, this delay here being equal to the period of the original signals, and a temporal sub-sampling circuit 10"a operating in the same ratio as the ratio of the circuit 10'a.

Figure 2:
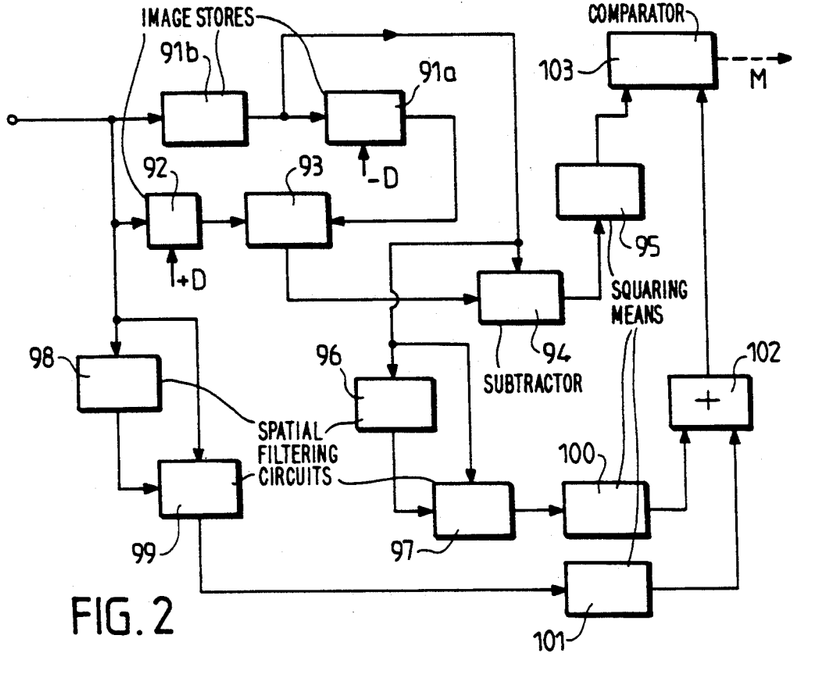
FIG. 2 shows, in this arrangement, an embodiment of the recovery sub-assembly with motion compensation and of the decision circuit of the decision-taking sub-assembly.

The signal processing arrangement also includes a recovery sub-assembly with motion compensation intended to supply, on the basis of a portion of those blocks which, in the original signals, induced the transmission and/or storage in accordance with the compensated mode and on the other hand motion information components associated with the said blocks by replacing the cancelled blocks, the signal blocks such as they will be recovered, on reception, by replacing the non-transmitted blocks, on the basis of the transmitted signal sequences and transmitted motion information components. Here this sub-assembly includes, as shown in FIG. 2, image stores 91a, 91b and 92, and also an adder 93. These elements render it possible to effect a motion-compensated interpolation, by a half-sum of the image $I_1$ (present at the output of the store 91a while taking into account the displacement vector D selected by the motion estimation circuit 20) and the image $I_3$ (present at the output of the store 92 while also taking D into account), the addresses in these stores 91a and 91b also being shifted, by $-D$ in the store 91a and by $+D$ in the store 92. The motion-compensated image resulting from this interpolation is supplied by the adder 93.

Finally, the signal processing arrangement includes a decision-taking sub-assembly, which here comprises a change-over switch 80'a which is controlled by a decision circuit. In the example described here (see FIG. 2), the decision circuit (94 to 103) is formed by a subtractor 94, which subtracts the image $I_2$, present at the output of the store 91b, from the motion-compensated image present at the output of the motion-compensation recovery sub-assembly (that is to say at the output of the adder 93), and a means 95 for squaring the output of this subtractor 94 which together form an interpolation error calculating circuit (94, 95) operating in the motion-compensation mode. This interpolation error is calculated for each block. A circuit (96, 97, 98, 99, 100, 101, 102, 103) similarly allows an error calculation in the fall-back mode, and to this effect includes spatial filtering circuits (96, 97) and (98, 99) of the image $I_3$, each comprising a spatial filter 96 or 98 and a subtractor 97 or 99, thereafter means 100 and 101 for squaring the output signals of the said spatial filtering circuits, an adder 102 which produces the half-sum of the output signals of these squaring means 100 and 101, and a comparator 103 comparing the output signals of the squaring means 95 and of the adder 102. This comparator 103 selects the output which is the weakest and for each image block supplies a corresponding mode information: the compensated mode in the case the output of the squaring means 95 is selected, and the fall-back mode in the opposite case.

The mode of operation of the arrangement shown in FIG. 1 is as follows. In accordance with the first transmission mode (compensated mode), the temporal sub-sampling sub-assembly—in this case the circuit 10'a—supplies a first signal sequence. The ratio of the temporal sub-sampling being equal to ½ in the example described, the frequency of these signals is, as has already been described, equal to 12.5 Hz. In accordance with the second transmission mode (fall-back mode) a second signal sequence which is in synchronism with the first signal sequence is also transmitted, namely the output signals of the temporal sub-sampling circuit 10"a. Thus, the normally transmitted signals are the blocks available at the output $S_1$, and the fall-back blocks present at the output $S_2$ are adjacent thereto (when the decision circuit 90 controls closure of the change-over switch 80'a).

In a variation of the embodiment, the fall-back processing sub-assembly also includes a spatial sub-sampling sub-assembly. The latter, shown in FIG. 3, comprises itself a first and a second spatial sub-sampling path which is arranged in series with the outputs $S_2$ and $S_1$, respectively. The first path includes a spatial filtering circuit 30'a and a first spatial sub-sampling circuit 40a which operate in a ratio ½ (for example a sub-sampling in line quincunx, or rather an orthogonal sub-sampling). The second path includes a spatial filtering circuit 30"a which is identical to the preceding circuit and a second spatial sub-sampling circuit 60a operating at a ratio ½, the latter sub-sampling being similar or complementary to the sub-sampling effected by the circuit 40a, that is to say in the case of the cited sampling matrix examples, the sub-sampling in line quincunx or the identical or complementary orthogonal sub-sampling operation.

Figure 4A:
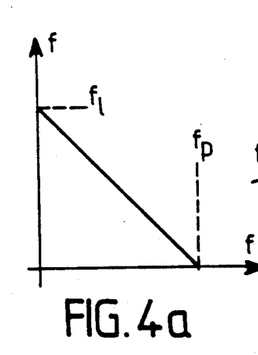
FIGS. 4a to 4c show three examples of transfer characteristics of the filtering circuits of the structure of FIG. 3, adapted to different sub-sampling lattices, respectively, such as those shown in FIGS. 5a to 5c.
Figure 4B:
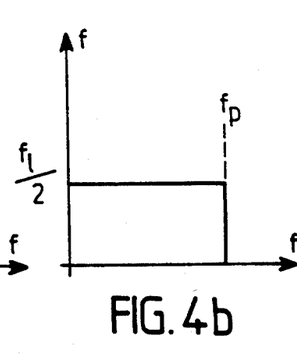
Figure 4C:
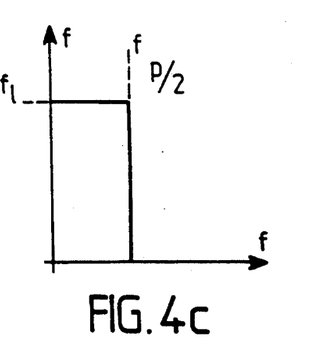
Figure 5A:
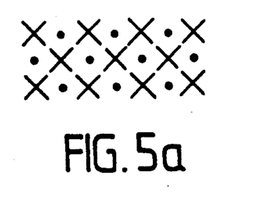
Figure 5B:
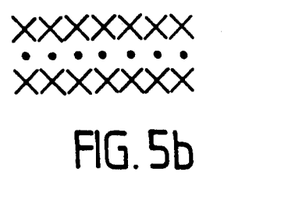
Figure 5C:
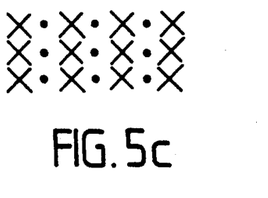

Examples of filtration effected by the spatial filtering circuits are shown in the FIGS. 4a to 4c in accordance with the nature of the sampling grid: if $f_p$ and fo are the horizontal frequencies (elements) and vertical frequencies (lines), respectively, of the image, FIG. 2a shows the filtering mode effected for the case of a line quincunx sub-sampling operation such as the one shown in FIG. 5 (the crosses and points represent the preserved image elements and the cancelled image elements, respectively, during the sub-sampling operation), in FIG. 4b for the case of a vertical orthogonal sub-sampling operation (one line out of two is omitted, as shown in FIG. 5b), and in FIG. 4c for the case of a horizontal orthogonal sub-sampling operation (one element out of every two elements of each line is omitted, in vertically aligned positions as shown in FIG. 5c).

The spatial sub-sampling sub-assembly also includes, arranged at the output of the two parallel paths, a switch 70a whose output alternately receives either the output of the spatial sub-sampling circuit 40a, or the output of the spatial sub-sampling circuit 60a. Thus, on the basis of samples of two consecutive images, a complete image is available at the frequency of 12.5 Hz at the output of the change-over switch 70, this image being obtained by mixing two previously filtered images.

Figure 3:
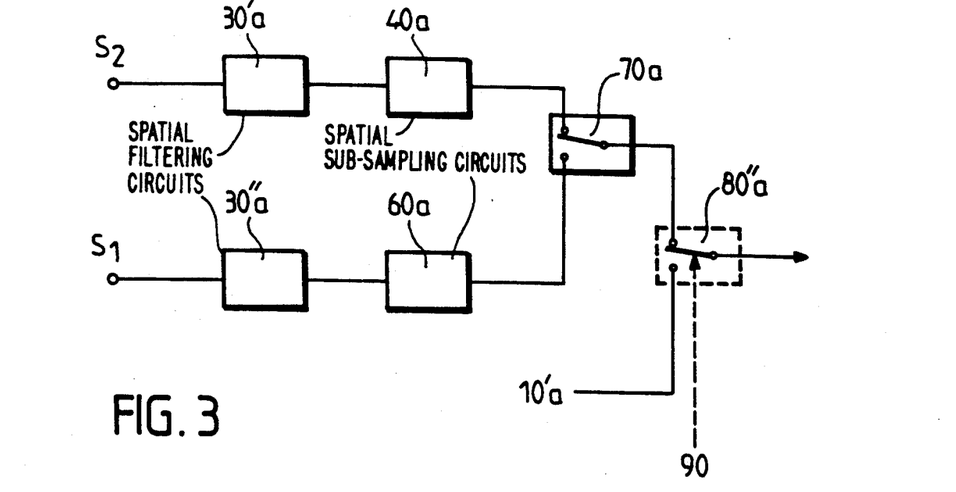
FIG. 3 shows, in combination with FIG. 1, a further embodiment of the fall-back processing sub-assembly.

For the case of this variation shown in FIG. 3, the decision-taking sub-assembly includes a second change-over switch 80"a intended to select, under the control of the decision circuit 90, in the compensated mode, the output signals of the second temporal sub-sampling circuit 10'a or, in the fall-back mode, the output signals of the switch 70a. This selection is effected, as previously, block-wise, by considering blocks of 16×16 or blocks of 8×8 (without these examples being limitative). For each block it is again one of the two modes which ultimately allows an image recovery with a minimal error chosen by the decision circuit.

Figure 6:
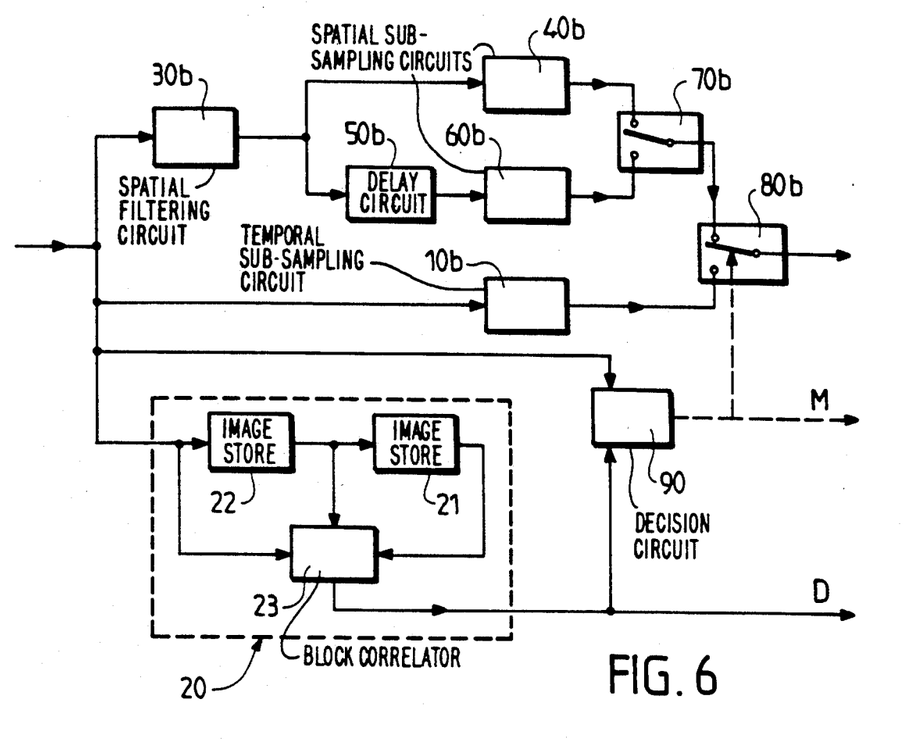
FIG. 6 shows a second example, in accordance with the invention, of an embodiment of the arrangement for processing signals intended to be transmitted and/or stored after flow rate reduction.

The realization of the fall-back processing sub-assembly corresponding to the combined FIGS. 1 and 3 is not the only possible realization. FIG. 6 shows a variation of the embodiment of the signal processing arrangement according to the invention in which another realization of the fall-back processing sub-assembly is provided, equivalent to the last-mentioned realization.

The signal processing arrangement shown in FIG. 6 includes, as in the preceding cases, a temporal sub-sampling sub-assembly, which here is a temporal sub-sampling circuit 10b operating at a ratio of ½ (identical to the circuits 10'a and 10"a), a motion estimation sub-assembly, a motion-compensation recovering sub-assembly, and a decision-taking sub-assembly. It also includes, as in the preceding cases, a fall-back processing sub-assembly which however is realized in the following manner. This sub-assembly includes first of all a spatial filtering circuit 30b which is intended to limit the passband of the signals. This spatial filtering circuit is followed by two parallel-arranged paths, the first of which includes a first spatial sub-sampling circuit 40b sampling at a rate of ½ (for example a sub-sampling in line quincunx, or rather an orthogonal sub-sampling), and the second path includes a delay circuit 50b and a second spatial sub-sampling circuit 60b sampling at a ratio ½. The delay produced by the circuit 50b is equal to the period of the original signals (here 25 Hz). The spatial sub-sampling realized by the circuit 60b is similar or complementary to the spatial sub-sampling realized by the circuit 40b, that is to say in the case of the sampling matrix examples cited, the sub-sampling in line quincunx or the identical or complementary orthogonal sub-sampling.

The fall-back processing sub-assembly also comprises, arranged at the output of the two parallel paths, a switch 70b whose output receives alternately either the output of the spatial sub-sampling circuit 40b, or the output of the spatial sub-sampling circuit 60b. Thus, at the output of the switch 70b, there is available, from the samples of two consecutive images, a complete image at the frequency of 12.5 Hz, obtained by mixing two previously filtered images.

The signal processing arrangement also includes, as in the preceding case, a decision-taking sub-assembly, but which this time includes a change-over switch 80b, which is controlled by the decision circuit 90 to select, in the compensated mode, the output signals of the temporal sub-sampling circuit 10b or, in the fall-back mode, the output signals of the switch 70b.

It will here be noted that the invention is not limited to the processing arrangements described in the foregoing, but that it also relates to any type of transmission and/or signal storage system which on the one hand includes a stage intended to transmit information components which are representative of these signals towards a transmission or storage information carrier for these information components, and on the other hand a stage intended to receive information components thus transmitted and/or to read the information components thus stored: in the case in which this information carrier is of the limited passband type and in which a processing operation to reduce the quantity of information components before transmission and/or storage has proved to be necessary, the invention relates to such a system when its transmission stage includes one of the above-described signal processing arrangements.

Conversely, when the information components have been processed by a signal processing arrangement of the type described in the foregoing, it is thereafter provided to recover the signals at the original time rate. This operation can then be realized by a post-processing which will now be described with reference to FIG. 7 for the case in which a spatial sub-sampling has been effected on transmission. The structure of the arrangement in the absence of such a spatial sub-sampling at transmission can then easily be deduced from this FIG. 7.

The signal processing arrangement shown in FIG. 7 in three distinct situations corresponding to FIGS. 7a, 7b and 7c, respectively, and explained hereinafter, receives, in the example described, input images at a frequency of 12.5 Hz (which consequently follow each other every 80 ms) and, at the output of the arrangement, one wants to have images available at a frequency of 25 Hz. The input images are accompanied by motion information components D and information components M relative to the mode (motion compensated mode or fall-back mode), these motion and mode information components being also transmitted and/or stored by means of the said information carrier (see FIG. 1 or FIG. 6).

Figure 7A:
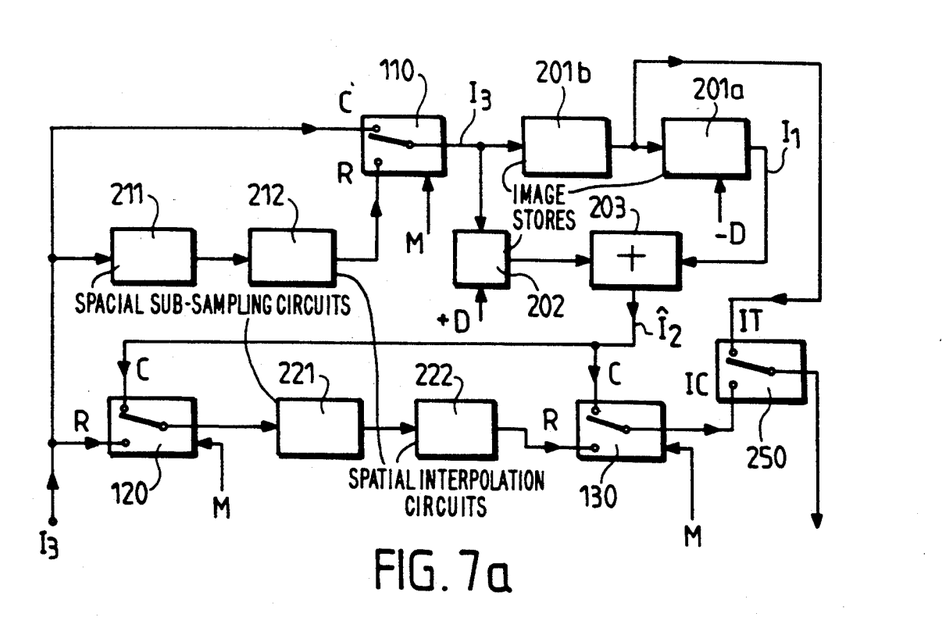
FIG. 7 is an embodiment, in accordance with the invention, of the arrangement for processing previously transmitted and/or stored signals after processing in an arrangement of the type corresponding to the arrangement shown in the associated FIGS. 1 and 3, and shown in FIGS. 7a, 7b, 7c for three different modes of operation.
Figure 7B:
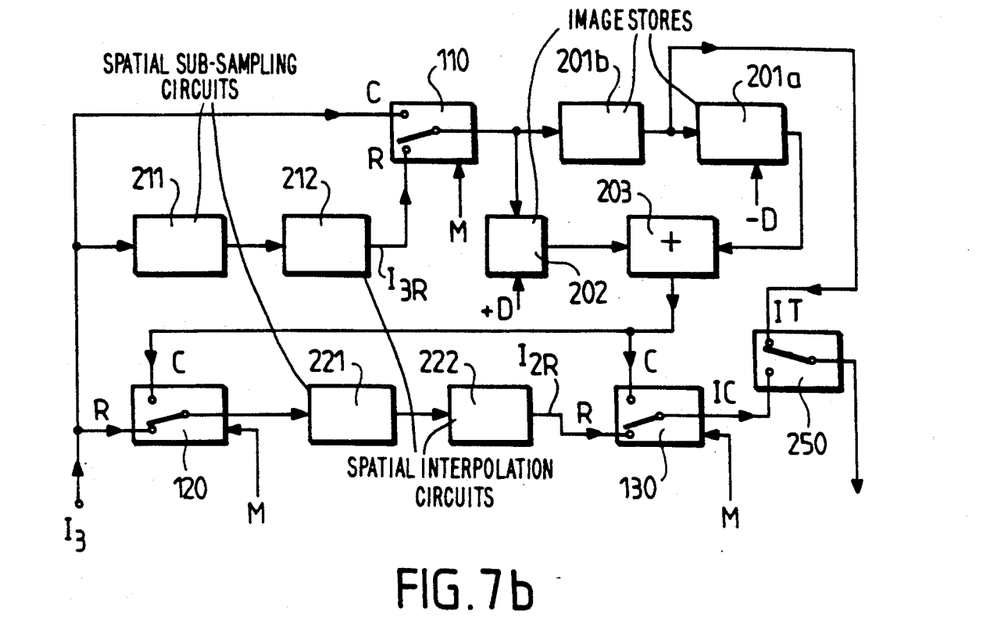
Figure 7C:
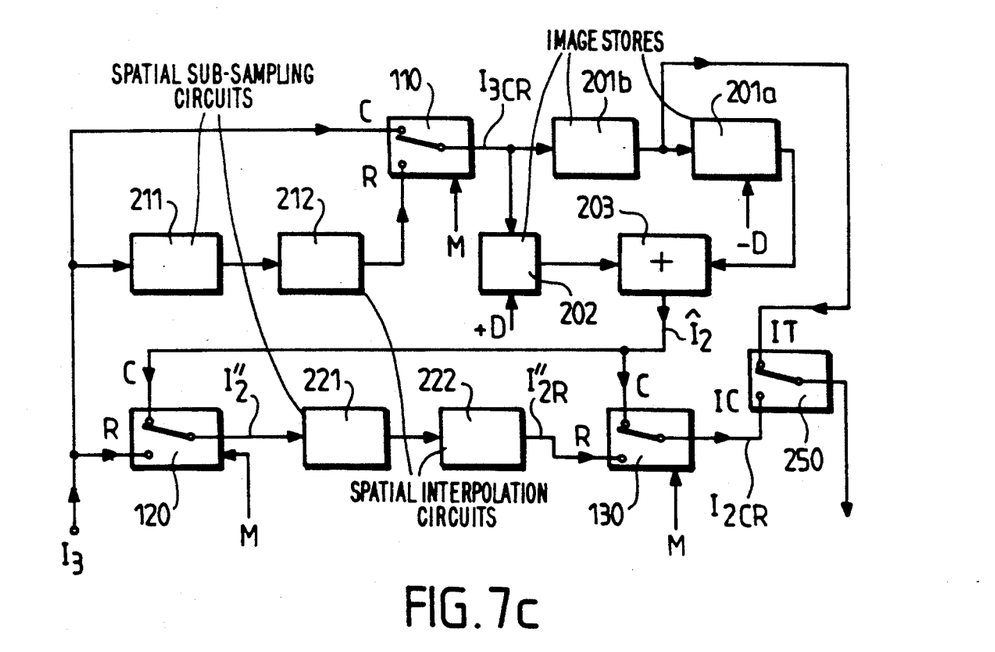

The processing arrangement shown in FIGS. 7a to 7c then includes, first of all, a motion compensation sub-assembly which itself comprises image stores 201a, 201b and 202 and an adder 203. This motion compensation sub-assembly is preceded by a change-over switch 110 which directly receives the input images at a first input terminal and at a second input terminal these same input images but via a first sub-sampling and interpolation sub-assembly. This first sub-sampling and interpolation sub-assembly includes a first spatial sub-sampling circuit 211 and a first spatial interpolation circuit 212, which is adapted to the sub-sampling mode employed in the circuit 211. The change-over switch 210 receives for each image block the mode information and, as a function thereof, changes to the direct connection position to the input (motion compensation mode, denoted C at the corresponding input of the change-over switch 110) or, in contrast thereto to the opposite position (fall-back mode, denoted R at the corresponding input of the change-over switch 110), to select in this position the output signals of the first sub-sampling and interpolation sub-assembly.

The processing arrangement shown in FIGS. 7a to 7c also include a second sub-sampling and interpolation sub-assembly, which itself includes a second spatial sub-sampling circuit 221 and a second spatial interpolation circuit 222, which are identical to the circuits 211 and 212, respectively. This second sub-sampling and interpolation sub-assembly 221, 222, is preceded by a change-over switch 220 and is followed by a changeover switch 130. The change-over switch 120 receives at a first input terminal the output signals from the motion compensation sub-assembly, and at a second input terminal directly the input images, and, in accordance with the mode information received, selects either the motion compensated signals (motion compensation mode, denoted C), or the input images (fall-back mode, denoted R). At a first input terminal the change-over switch 130 also receives the output signals of the motion compensation sub-assembly, and at a second input the output signals of the second sub-sampling and interpolation sub-assembly, and, in accordance with the mode information received, selects either the motion compensated signals, (motion compensation mode, denoted C), or the output signals of the second sub-sampling and interpolation sub-assembly (fall-back mode, denoted R).

The processing arrangement of FIGS. 7a to 7c finally includes a change-over switch 250 which, at twice higher rate than the input images (at the frequency of 25 Hz in the present case, since the input images here have a frequency of 12.5 Hz), alternately selects the output of the change-over switch 130 or that of the image store 201b.

The mode of operation of this processing arrangement will now be described for three situations which can be met in actual practice, with reference to the corresponding FIGS. 7a to 7c. First it should be remembered that the input images of the arrangement may be constituted by processed image blocks, before transmission and/or storage, either in accordance with the motion compensation mode, or the fall-back mode, or also in accordance with one or the other of these two modes, these three alternatives corresponding to the said three situations.

Let it first be assumed (first situation, shown in FIG. 7a) that the input images are exclusively formed by processed image blocks, before transmission and/or storage, in accordance with the motion compensation mode. The information of the corresponding mode then keeps the three change-over switches 110 to 130 in their position C. If, moreover, the sequence of input images are denoted $I_1$, $I_3$, $I_5$, $I_7$, etc. ... and at a considered instant $t_c$ the image $I_1$ (compensated by $-D$) is available at the output of the image store 201a, at the same instant the image $I_3$, which appeared 80 ms after $I_1$, is available at the input of the image store 201b. The change-over switch 250 then selects, in its position denoted IC, the output of the adder 203 of the motion compensation sub-assembly. The image denoted $\hat{I}_2$ available at this output is the image having a parity opposite to that of the images $I_1$ and $I_3$ and is recovered, between these two images, at 40 ms from each of them, by the half-sum of these images $I_1$ and $I_3$ and takes the direction of the displacement vector D (which was previously selected and applied to the said motion compensation sub-assembly) into account. At the frequency of 25 Hz, that is to say 40 ms later, the change-over switch 250 has changed state and, in its position denoted IT, selects the output of the store 201d, this output now being $I_3$ since $I_3$ appeared 40 ms earlier at the input of the store 201b.

The same change-of-state cycle then proceeds, and the change-over switch 250 thereafter selects the image $\hat{I}_4$ which is the weighted average of $I_3$ and $I_5$ in the direction of the new selected displacement vector, thereafter the image $I_5$, then $\hat{I}_6$, $I_7$, $\hat{I}_8$, $I_9$ etc. ... Finally, at the output of the change-over switch 250 and consequently of the processing arrangement of FIG. 7a an image sequence of the type $I_1$, $\hat{I}_2$, $I_3$, $\hat{I}_4$, $I_5$, $\hat{I}_6$, $I_7$, etc. .., is available at a frequency twice as high as the frequency of the input images.

Let it now be assumed (second situation, shown in FIG. 7b) that the input images are exclusively formed by processed image blocks, before transmission and/or storage, in accordance with the said fall-back mode. The corresponding mode information this time maintains the three change-over switches 110 to 130 in their position R. The spatial sub-sampling circuit 211 sub-samples the determined parity images (for example odd images, that is to say the images $I_1$, $I_3$, $I_5$, etc. ... ) in accordance with the same sampling matrix as that used during the processing operation at the transmission end, thereafter, the spatial interpolation circuit 212 recovers the missing samples. If for an input image $I_3$, the image available at the output of the circuit 212 of the first sub-sampling and the interpolation sub-assembly is denoted $I_{3R}$, it will then be found that, now, the image $I_{3R}$ is substituted for the input image $I_3$.

Similarly, the spatial sub-sampling circuit 221, and the spatial information circuit 222 ensure respectively the sub-sampling of the images having an opposite parity (for example the even images $I_2$, $I_4$, $I_6$, etc. ... ), in accordance with the same phase of the sampling matrix as that previously employed, and the recovery of the missing samples. For an input image $I_3$, this image recovered at the output of the circuit 222 of the second interpolation sub-sampling sub-assembly is now denoted $I_{2R}$. The change-over switch 250 then selects in its position IC the image designated $I_{2R}$ available at the output of the said second sub-assembly and, in its position IT, the image designated $I_{3R}$, available 40 ms earlier at the output of the first sub-sampling and interpolation sub-assembly and now available at the output of the image store 201b. This time, an image sequence of the type $I_{1R}$, $I_{2R}$, $I_{3R}$, $I_{4R}$, $I_{5R}$, etc. ... , is available at the output of the processing arrangement of FIG. 7c, always at a frequency which is twice the frequency of the input images.

Let it finally be assumed (third situation shown in FIG. 7c, and in general the most frequently occurring situation) that the input images are recovered simultaneously from image blocks processed at the transmission end in accordance with the motion compensation mode, and image blocks processed at the transmission end in accordance with the fall-back mode. The mode information, corresponding to each of the two modes, then switches the three change-over switches 110, 120, 130, alternately to their position C or to their position R, according to the processing type to which the image blocks appearing at the input of the processing arrangement were previously submitted: the processing operations effected in this arrangement will then be those processing operations effected in the case of the first or the second situation, as the case may be.

Actually, in the case of the fall-back mode blocks, the first sub-sampling and interpolation sub-assembly (211, 212) consecutively provides the recovery of the samples of the images of a predetermined parity (odd, for example) and the recovery of the missing samples. The blocks $I_{3R}$ available at the output of the said first sub-assembly are then reinserted by the change-over switch 110 into the input image $I_3$, to form the future output image called $I_{3CR}$. Similarly, for the case of fall-back mode blocks, the second sub-sampling and interpolation sub-assembly (221, 222) provides the recovery of the images of the opposite parity (here the even images), by processing the output signals of the change-over switch 120, which has for its function, in this second situation, to insert the compensated blocks $I_2$ (available in the manner already described, at the output of the motion compensation sub-assembly 201a to 203) into the input image $I_3$. The image thus formed at the input of the said second sub-assembly is designated $I_2''$, and the image at the output is designated $I''_{2R}$. The change-over switch 130 then renders it possible to complete the future output image $I_{2CR}$ by selecting, as a function of the mode information it receives and which controls its position, either the compensated output block $\hat{I}_2$ of the motion compensation sub-assembly, or the interpolated output blocks $I''_{2R}$ of the second sub-sampling and interpolation sub-assembly.

Then, in this third situation the change-over switch 250 can now select either, in its position denoted IC, the output image $I_{2CR}$ of the change-over switch 130, or, in its position IT, the image $I_{3CR}$ available 40 ms earlier at the output of the change-over switch 110 and now present at the output of the image store 201b. Again, at the output of the processing arrangement of FIG. 7c, a sequence of images of the type $I_{1CR}, I_{2CR}, I_{3CR}, I_{4CR}, I_{5CR}$, etc. ... is available again at a frequency twice the frequency of the input images.

The arrangement for processing signals after transmission and/or storage described in the foregoing with reference to FIG. 7 corresponds to the arrangement for processing signals before transmission and/or storage described in association with the combined FIGS. 1 and 3. In the absence of the spatial sub-sampling on transmission (that is to say with only the fall-back processing sub-assembly as described in FIG. 1) the processing arrangement of FIG. 7 is simplified in the following manner. On the one hand the two interpolation and sub-sampling sub-assemblies (211, 212) and (221, 222), are omitted, and also the corresponding change-over switches 110 and 120. On the other hand, the signals corresponding to the signals $S_1$ and $S_2$ of FIG. 1 are now, taking this suppression into account, applied to the input of the motion compensating sub-assembly, (common input of the stores 201b and 202) and to the input R of the change-over switch 130, respectively. These modifications which can easily be understood from FIG. 7, are therefore not shown.

It must be understood that the present invention is not limited to the examples described thus, on the basis of which variations can be proposed without departing from the scope of the invention. Certain of these variations have already been mentioned. It will also be noted that the criterion used to determine whether the motion estimation circuit 20 is lacking and must be replaced by the fall-back processing sub-assembly can correspond to a large range of situations. The main criterion which can be maintained is, for example, the fact that the motion is either too fast or not too fast and that then the motion estimation circuit moves outside its operating range. But it is also possible to provide a trigger control in the fall-back mode when the noise becomes too great and results in estimation errors, or when operations are effected in an image zone where the objects have opposite motions and put the motion estimation circuit out of order.

Moreover, it is obvious once again that the invention is not limited to the processing arrangement just described, but that it also relates to any transmission and-/or signal storage system comprising on the one hand a stage intended to transmit information components representative of these signals to a transmission or storage carrier of these information components, and on the other hand a stage intended to receive the information components thus transmitted and/or to read the information components stored thus: in the case in which this information carrier has a limited passband and in which a processing operation for reducing the quantity of information components before transmission and/or storage proves to be necessary, the invention also relates to such a system when its receiving stage includes one of the signal processing arrangements described in the foregoing.

We claim:

1. An arrangement for processing a first sequence of block signals having a first rate and which are grouped in periodic clusters, such as images, and which are intended to be transmitted and/or stored as an output sequence of block signals over/on a passband-limited information carrier, said arrangement comprising:
   (a) means for operating said arrangement in a first mode comprising:
      (i) a temporal sub-sampling sub-assembly for cancelling selected ones of said first sequence of block signals so as to provide from said first sequence of block signals at a predetermined temporal sub-sampling ratio, a second sequence of block signals having a rate lower than that of said first sequence of block signals; and
      (ii) a motion estimation sub-assembly for estimating motion between a plurality of said first sequence of block signals which belong to consecutive periodical clusters and for providing a plurality of motion information signals to be transmitted and/or stored in place of said selected ones of said first sequence of block signals cancelled by said temporal sub-sampling sub-assembly, so as to provide said output sequence of block signals;
   (b) a signal block recovering sub-assembly provided to supply from said second sequence of block signals and said motion information signals, a third sequence of block signals corresponding to said selected ones of said first sequence of block signals cancelled by said temporal sub-sampling sub-assembly;
   (c) a decision-taking sub-assembly, provided to supply block-wise, on the basis of a comparison of said first sequence of block signals and said third sequence of block signals, a selection signal;
   (d) means for operating said arrangement in a second mode, comprising:
      (i) means for providing a fourth sequence of block signals in synchronism with said first sequence of block signals; and
      (ii) means for providing as said output sequence of block signals, in response to said selection signal, a fifth sequence of block signals comprising said fourth sequence of block signals in combination with said second sequence of block signals.

2. An arrangement as claimed in claim 1, wherein the decision-taking sub-assembly includes a change-over switch controlled by a decision circuit for selecting, in the first mode, said second sequence of block signals, and in the second mode, said fifth sequence of block signals.

3. An arrangement as claimed in claim 1, wherein the predetermined ratio is equal to $\frac{1}{2}$.

4. An arrangement as claimed in claim 3, wherein the second mode operating means comprises a delay circuit producing a delay equal to the period of said first sequence of block signals, followed by a temporal sub-sampling circuit operating in the same ratio as the ratio of the temporal sub-sampling sub-assembly.

5. An arrangement as claimed in claim 4, wherein the second mode operating means comprises a spatial sub-sampling sub-assembly which includes, arranged in parallel, a first spatial sub-sampling channel and a second spatial sub-sampling channel.

6. An arrangement as claimed in claim 3, wherein the second mode operating means comprises a spatial sub-sampling sub-assembly which includes, arranged in parallel, a first spatial sub-sampling channel and a second spatial sub-sampling channel.

7. An arrangement as claimed in claim 2, wherein the second mode operating means comprises a spatial sub-sampling sub-assembly which includes, arranged in parallel, a first spatial sub-sampling channel and a second spatial sub-sampling channel.

8. An arrangement as claimed in claim 1, characterized in that:
   (A) the temporal sub-sampling ratio is equal to $\frac{1}{2}$;
   (B) the second mode operating means comprises arranged in parallel with the said temporal sub-sampling sub-assembly, a spatial sub-sampling sub-assembly which comprises two parallel-arranged channels the first of which comprises a first spatial sub-sampling circuit and the second comprises, arranged in series, a delay circuit producing a delay of one period of the first sequence of block signals and a second spatial sub-sampling circuit, and said two parallel channels being preceded, by a spatial filtering circuit in series with a first change-over switch provided to select alternately, one or the other of the outputs of the spatial sub-sampling circuit at a frequency which is twice lower than that of said first sequence of block signals:
   (C) the decision-taking sub-assembly comprises a second change-over switch controlled by a decision circuit for selecting, in the first mode, said second sequence of block signals and, in the second mode, the output signals of said first change-over switch.

9. A signal transmission and/or storage system comprising an arrangement as claimed in claim 1, and a receiving and/or read stage for the signals to be transmitted and/or stored.

10. An arrangement as claimed in claim 1, wherein the second mode operating means comprises a spatial sub-sampling sub-assembly which includes, arranged in parallel, a first spatial sub-sampling channel and a second spatial sub-sampling channel.

11. An arrangement as claimed in claim 10, that wherein the predetermined ratio is equal to $\frac{1}{2}$.

12. An arrangement as claimed in claim 11, wherein:
   (A) the spatial sub-sampling sub-assembly comprises, in each of said first and second spatial sub-sampling channels, a spatial filtering circuit followed by a spatial sub-sampling circuit operating in a ratio $\frac{1}{2}$, and at the output of the two channels, a switching circuit provided to select alternatively one or the other of the outputs of the spatial sub-sampling circuit at a frequency twice lower frequency than that of said first sequence of block signals:
   (B) the decision taking sub-assembly includes a changeover switch controlled by a decision circuit to select, in the first mode, said second sequence of block signals of the temporal sub-sampling sub-assembly or, in the second mode, the output signals of said switching circuit.

13. An arrangement as claimed in claim 12 wherein said first sequence of block signals are signals which represent images, and wherein the decision circuit comprises an interpolation error calculating circuit and a circuit for performing an error calculation in said second mode.

14. An arrangement as claimed in claim 13, characterized in that the passband-limited information carrier is of the compact disc type.

15. An arrangement for processing previously transmitted and/or stored signals after reduction of the quantity of information components to be transmitted and/or stored, effected either in accordance with a first compensated transmission and/or storage mode and with the aid of a temporal sub-sampling sub-assembly in a predetermined ratio, provided to supply a first signal sequence, or in accordance with a second fall-back transmission and/or storage mode and with the aid of a fall-back processing sub-assembly provided to adapt a second signal sequence to the said first sequence, the choice of the said mode being effected with the aid of a decision-taking sub-assembly and on the basis of the likewise transmitted and/or stored motion information components and an information component comparison associated with one or the other mode, respectively, characterized in that it includes:
   (a) a motion compensated sub-assembly provided to receive the transmitted and/or stored signals corresponding the output signals of the said temporal sub-sampling sub-assembly;
   (b) a change-over switch receiving at a first input the output of the motion-compensation sub-assembly and at a second input of the transmitted and/or stored signals corresponding to the output signals of the said fall-back processing sub-assembly and supplying from its output in accordance with the said mode information corresponding to the first or the second mode of operation, either the signals present at the said first inputs or the signals present at the said second input, respectively;
   (c) an alternating selection change-over switch for selecting at a frequency twice as high as that of the input signals either the said outputs of this change-over switch, or the input of the said motion-compensated sub-assembly but delayed by a half period of the rate of the said input signals of the signal processing arrangement.

16. A signal transmission and/or storage system comprising a signal processing arrangement as claimed in claim 15 and, a receiving and/or read stage for the transmitted and/or stored signals.

17. An arrangement for processing previously transmitted and/or stored signals after reduction of the quantity of information components to be transmitted and/or stored, effected either in accordance with a first mode denoted the compensated transmission and/or storage mode and with the aid of a temporal sub-sampling sub-assembly in a predetermined ratio provided to supply a first signal sequence, or in accordance with a second mode, denoted the fall-back transmission and/or storage mode and with the aid of a fall-back processing sub-assembly provided to add a second signal to the said first sequence with spatial sub-sampling of the said sequences, and to effect the alternate selection of one or the other of these spatially sub-sampling sequences, the choice of the said mode being effected with the aid of a decision-taking sub-assembly and on the basis of likewise transmitted and/or stored motion information components, and an information component comparison associated with one or the other mode, respectively, with a view to selecting either the output of the said motion-compensated sub-assembly or the output of the said fall-back processing sub-assembly, characterized in that it comprises:

(a) a first sub-sampling and interpolation sub-assembly of the received signals corresponding to the previously transmitted and/or stored signals and constituting the input signals of the arrangement;

(b) a motion-compensation sub-assembly whose input is connected in accordance with the said selection of the first or the second operating mode, respectively, either directly to the input of the said arrangement or to this same input but via the said first sub-sampling and interpolation sub-assembly;

(c) a second sub-sampling and interpolation sub-assembly whose input is connected, in accordance with the said selection of the first or the second mode of operation, respectively, either to the output of the said motion-compensation sub-assembly, or directly to the input of the said arrangement;

(d) a change-over switch which from its output or in accordance with the said mode information corresponding to the selection of the first or second mode of operation, respectively, supplies from its output either the output of the said motion-compensation sub-assembly or the output of the said second sub-sampling and interpolation sub-assembly;

(e) a change-over switch for alternately selecting at a frequency twice as high as the frequency of the input signals, either the said output of this change-over switch or the input of the said motion-compensation sub-assembly but delayed by a half-period of the rate of the said input signals of the arrangement.

18. An arrangement as claimed in claim 17, characterized in that the first and second sub-sampling and interpolation sub-assemblies each comprise a spatial sub-sampling circuit and a spatial interpolation circuit, and in that the motion-compensation sub-assembly comprises image stores and an adder, with a view to a motion compensated interpolation on the basis of the output image of the first of these stores, of the input image of the second of these stores, and the information about movement between the said input and output images, the delay caused by each of the said stores being equal to half the period of the input signals of the processing arrangement.

19. An arrangement as claimed in claim 17, characterized in that the selection at the input of the motion compensation sub-assembly and the selection at the input of the second sub-sampling and interpolation sub-assembly are effected with the aid of a first and a second change-over switch, respectively, which are provided to switch in accordance with the said mode information.

* * * * *